(12) United States Patent
Marinacci (10) Patent No.: US 6,456,322 B1
(45) Date of Patent: Sep. 24, 2002

(54) INTRUSION PROTECTION SYSTEM WITH TELEVISION DEVICE

(75) Inventor: Angelo Marinacci, Via Rezzonigo1 (IT)

(73) Assignee: Sideral S.r.l., Robbiate (IT)

( * ) Notice: Subject to any disclaimer, the term of this patent is extended or adjusted under 35 U.S.C. 154(b) by 0 days.

(21) Appl. No.: 09/308,471
(22) PCT Filed: Feb. 21, 1997
(86) PCT No.: PCT/IT97/00035
§ 371 (c)(1),
(2), (4) Date: May 17, 1999
(87) PCT Pub. No.: WO98/26389
PCT Pub. Date: Jun. 18, 1998

(30) Foreign Application Priority Data

Dec. 9, 1996 (IT) .......................................... MI96A2573

(51) Int. Cl.[7] .......................... G08B 13/196; H04N 7/18
(52) U.S. Cl. ....................................................... 348/156
(58) Field of Search ................. 348/143, 151, 348/152, 153, 154, 155, 156, 157, 158, 159; H04N 7/18

(56) References Cited

U.S. PATENT DOCUMENTS 5,428,388 A * 6/1995 von Bauer et al. ......... 348/155

* cited by examiner

Primary Examiner—Howard Britton
(74) Attorney, Agent, or Firm—Michael J. Striker (57) ABSTRACT

Electronic anti-intrusion warning and protection system for isolated houses, apartment blocks and business premises generally, comprising one or more electronic units, remote transmitting (50), supplied with microtelecameras (51), placed in the internal (10) and external (40) areas to be guarded, whether associated or not to various services such as street lamps (41), light bulbs, street buzzer panels, and a receiving electronic unit (20) connected to the screen of a television set or of a computer or to a video recorder and the like, each remote unit (50) automatically transmitting the image (58) of a person (57), who passes within the range of operation of the telecamera (51), to the local unit (20) that transfers it to the screens or to a video cassette of the video recorder where the images that may be present on the screens or that are being recorded, are replaced by the image of said person, said apparatuses being turned on for the purpose if turned off at the time of need.

15 Claims, 11 Drawing Sheets

INTRUSION PROTECTION SYSTEM WITH TELEVISION DEVICE

BACKGROUND OF THE INVENTION

The invention concerns electronic alarm and safety devices for isolated houses, apartments, industrial buildings, areas to protect generally. A great number of systems and types of equipment exist for protection against intruders of all kinds, divided substantially into two main groups. The first uses visual and acoustic warnings to indicate the presence of unexpected persons at unexpected times inside or close to buildings that may be inhabited or used for offices, industry, warehouses or other purposes.

The second informs a watchman, provided with a monitor, of the presence of persons and objects at unexpected times and places.

The two categories can of course be associated to get the best results.

The second referred to above is obviously the safest as any intruder trying to gain entrance can be seen at once.

But this second category is necessarily limited to large buildings or to the more luxory types of housing in view of the high costs involved, both for purchasing the necessary apparatus and for installing it, as well as for the personnel needed to watch the screen on which the image would appear.

The first category gives good results at moderate prices but presents the serious drawback of simultaneously warning not only the occupiers of the place to be protected but also the intruder who then has time to get away and avoid capture.

In any case the cost of a really efficient warning system is usually beyond the financial means of the would-be user who therefore has to forgo protection even where existence of a high risk would make it necessary.

These latter cases must include those relating to periods, which may even be quite long, when the attention of a person or a family is centered on a video image, for example in some isolated habitation during the evening, and little notice is likely to be taken of unusual noises partly covered by the sound emitted by a television set.

Another typical case is that of an office in which staff closely watching a computer cannot pay much attention to unusual noises or movements that might proceed from or be associated with the activity of an intruder of some kind.

In most apartment blocks the main outer door may easily be opened at once at the request of a visitor who does not arouse suspicion. Having opened the main door or even one to an apartment, the user may suddenly find himself face to face with some ill-intentioned person who can then enter without difficulty.

SUMMARY OF THE INVENTION

The above invention deals almost entirely with most of the above problems mainly using equipment already in the home or office simply adding inexpensive and easily-installed accessories.

Subject of the invention is an electronic anti-intruder alarm and protection system for isolated houses, apartment blocks, businesses and others.

This system comprises:
  one or more electronic transmitting units, here called remote units, with micro-telecameras placed at the entrances, and inside and outside the buildings to be guarded;
  a receiving electronic unit, here called a local unit, connected to a television or computer screen or to a video recorder, or the like.

Whenever some presence, usually a person, crosses the space covered by the telecamera, each remote unit automatically transmits the person's image to the local unit which transfers it to the screen or to the video-cassette of the video recorder.

This image replaces any that may be present on the screen or are being recorded.

In this way the image of an unwanted intruder can be viewed immediately and be recorded in real time.

As soon as some presence enters the range of action of the telecameras, these remote units at once send the image to the local unit.

Similarly, when someone rings the bell at the entry to a building or presses a street buzzer button and in so doing enters the range of action of the telecameras, the remote units transmit the image to the local unit. Having received the image from the remote units, the local unit automatically turns on the screen of a television set or of a computer, or turns on a video recorder or automatically comes onto such screens replacing what was there before or replacing what a recorder was recording.

The remote units show their connection, hereinafter called "active connection", with the local unit by signalling a "carrier presence".

When a proximity sensor, associated to the telecameras, notes a presence, especially of a person, in its field of action, it transmits a warning signal, hereinafter called a "warning signal", to said local unit.

When said local unit receives both the signal of "active connection" and the "warning signal", it produces a signal, hereinafter called a "starting signal", that determines transmission of the image to the television or computer screen or to the video recorder.

The remote units can be fitted with a twilight sensor which, when environmental light falls below a certain level, works a switch to light up a lamp that illuminates the field of action of the telecameras.

This present electronic system is modular and built in sections, so that:
  the remote and local units can be equipped only with the functions that are desired for each case according to needs and preferences;
  one or more, and one or other, of the remote and local units can be connected, and transmission frequencies of the remote units can be automatically dealt with by a single local unit;
  connection of remote units to the local electronic unit can be made by coaxial cable, radio frequency, conveyed waves on the local electricity network or other means.

Active connection between one or more remote units and the local unit, by a signal of carrier presence at the entrance, is only available periodically as, in the absence of the warning signal, the telecameras are turned on for only a few seconds with previously set and programmable switch-off and scanning times, a retriggable monostable circuit arranging to generate an ever-present signal of active connection if the carrier presence signal is not missing for more than the previously set scanning time.

The local unit comprises a control panel on which, through a Scart socket, the user can choose connection to the screen of a television set or of a computer or to a video recorder and the like and can operate the following functions:
  remote unit selection, exclusion of the twilight sensor on the unit selected, transmission of the image from the remote unit to a television screen, transmission of the image from the remote unit to a computer screen, recording of the image transmitted from remote unit to video recorder can note, by means of visual and acoustic warning devices, the following signals:

remote unit turned off warning signal from remote unit twilight sensor turned off on remote unit The user's choice is translated into a TV/TVR signal that indicates connection with the monitor or with the video recorder.

In the case of connection to the monitor, the warning signal is converted to a suitable electric level transmitted to one pin of the Scart socket; in the case of connection to a VPS-equipped video recorder, the signal is converted into an electric signal specific for the recorder and, in the case of connection to a recorder without VPS, to a signal which reaches a contact placed between two pins on the Scart socket.

In the case of transmission by means of radio waves, the signal from a telecamera modulates, by an RF modulator, a radio-frequency carrier radiated by a small antenna, arriving from a tone generator circuit, there being a different one for each remote unit as it is linked to the cabled address in "unit address" circuits.

The audio band of the modulator is used for transmission of a subaudio tone for signalling a presence, especially that of a person, within the field of action of the proximity sensor.

In the case of conveyed-wave transmissions, the signal from the telecameras is coded and sent to a line coupler that conveys it along the electricity network, prevents the network frequency, 50 Or 60 Hz for example, from reaching receiver or transmitter inputs at levels that can impede their operation, puts a signal into the electricity line at a sufficiently high level and at a frequency that can pass along the line, the signal transmitted being then decoded by a conveyed-wave receiver.

In the local unit a conveyed-wave generator can advantageously be placed to generate the signal, in which information about the input logic level can be coded, to be passed to the line coupler for entry into the local a.c. mains network while, in the remote unit, a conveyed-wave receiver is present to decode the signal transmitted at a frequency corresponding to the unit address where the receiver is placed.

Advantageously the local unit comprises acoustic and visual warning devices, preferably on the panel, that signal a presence in the telecamera's field of of action so as to warn the user of this presence, unless it is in the neighbourhood of the monitor or unless the monitor is outside its range.

Preferably the remote units can be associated with inclusion or addition of ordinary street lamps, other lamps, lighting equipment, buzzer plates for bells and for street bells, other forms of utilization generally.

The invention offers evident advantages.

By adding accessories at a practically negligible cost compared with the effects obtainable and possible, an ordinary television set, or PC, or an ordinary video recorder can be used not only as a video street buzzer and the like but also as an efficient alarm system, especially when the user's attention is engaged by a television programme or computer work, in which cases the automatic appearance on the screen of some intruder is superimposed over what the screen was showing at that moment, so preventing action by any such intruder wishing to benefit from the user's attention being otherwise engaged.

The possibility of using ordinary street lamps, other lighting means, bell and street buzzer panels and the like as remote units, is decisive in being able to place telecameras for this purpose in suitable positions.

By means of a single local unit such as a TV set, computer and the like even a considerable number of remote units, placed at various points in buildings of any kind, situation and size, can be kept under control.

It is thus possible to protect buildings of all kinds and extension at a very low cost and, further, such protection implies all the advantages of video types of street buzzers, giving not only immediate warning of danger but also offering a useful view of any visitor asking for admittance at a street door or at that of a private house or apartment.

Characteristics and purposes of the invention will be made still clearer by the following examples of its execution illustrated by diagrammatically drawn figures.

DESCRIPTION OF THE PREFERRED EMBODIMENTS

Figure 1:
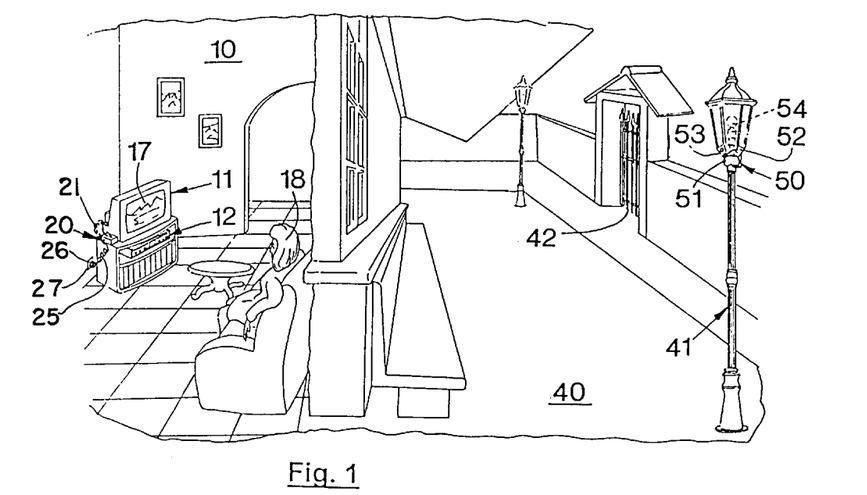
FIG. 1 A detached house fitted with the alarm system subject of the invention comprising an electronic remote unit mounted on a street lamp and an electronic local unit applied to a TV set, connected by a coaxial cable, a partly cut away perspective view.

In FIG. 1 we have an execution of the invention for protecting a detached house comprising an inside room 10 and an outside area 40 with a street lamp 41 and an entry gate 42.

Inside the house a television set 11 can be seen with a person 18 seated in front of it watching a programme 17.

Figure 2:
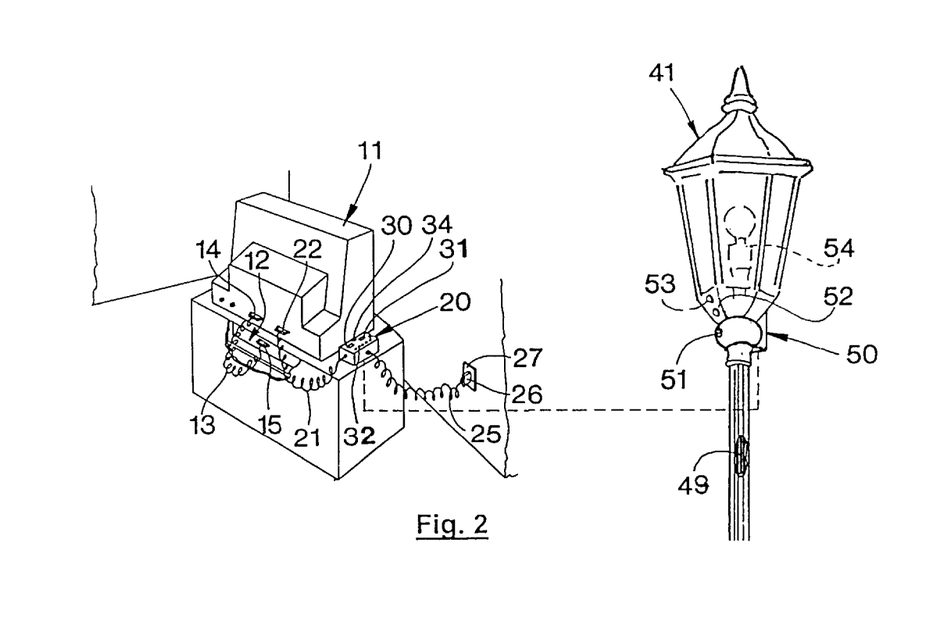
FIG. 2 Details of the remote and local units of a detached house, perspective.

The details in FIG. 2 show, inside the street lamp 41, an electronic device, inside a box, said device being hereinafter called a remote unit 50, fed by mains electricity through a cable 49 and connected to a micro-telecamera 51, a proximity sensor 52 and a twilight sensor 53 which, when daylight is failing, works the sensor, a switch on the lamp 54.

Inside a box near the television set is an electronic device hereinafter called a local unit 20 connected by a cable 25 with plug 26 to the wall socket 27 for mains electricity and by the cable 21 with a Scart socket 22 to the set.

By means of the cable 13 and Scart sockets 14 and 15, the television set is also connected to a video recorder 12.

The box 20 is provided with visual 32 and acoustic 34 warning devices. Using a set of controls 30, 31 placed on the box 20, the system can be switched on and off as desired, the video recorder 12, and the visual 32 and acoustic 34 warning devices be connected or disconnected.

The local 20 and remote 50 electronic units can advantageously be connected by coaxial cables, radio waves, conveyed waves or other means.

Figure 3:
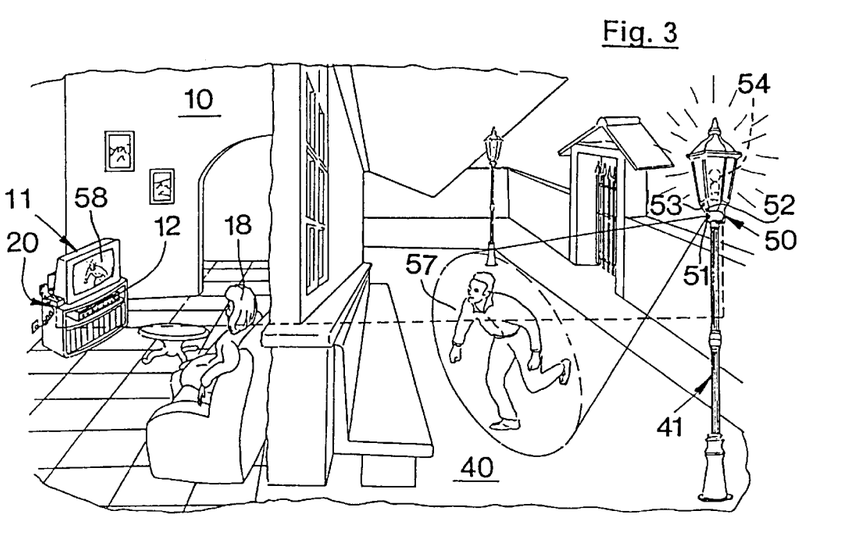
FIG. 3 The detached house when the alarm is given.

FIG. 3 shows the effect of the presence of a person 57 in the range of vision of the telecamera 51 and of the proximity sensor 52 after sundown. The twilight sensor 53 has switched on the bulb 54 of the street lamp 41. The image 58 of the person 57 immediately replaces the image 17 on the television screen 11, warning the user 18 that someone has come in. If the video recorder 12 has been connected, the image will not only be shown on the screen but will also be recorded in a video cassette.

Figure 4:
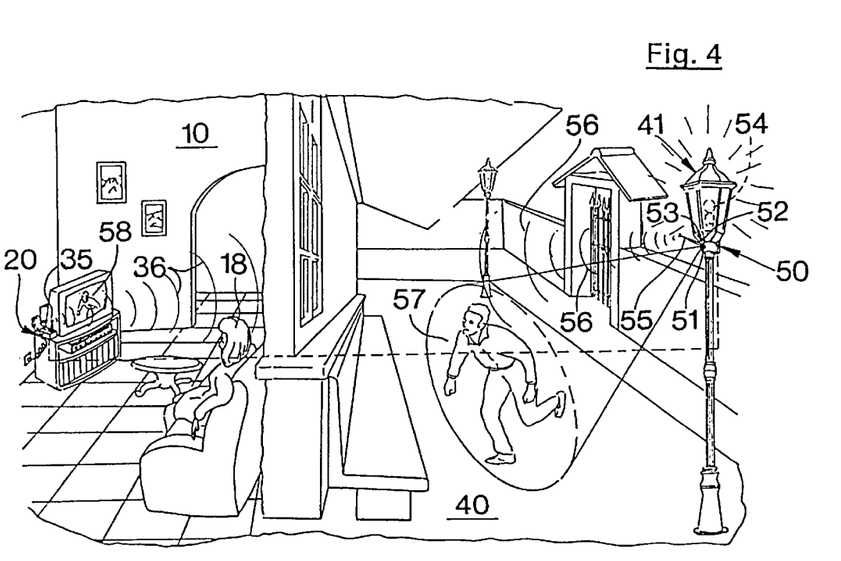
FIG. 4 The same as above connected by radio frequency.

FIG. 4 indicates connection between the local unit 20 and remote unit 50 by radio waves transmitted 56 from the antenna 55 mounted on the lamp 41 and received 36 by the antenna 35 on the local unit 20.

Figure 5A:
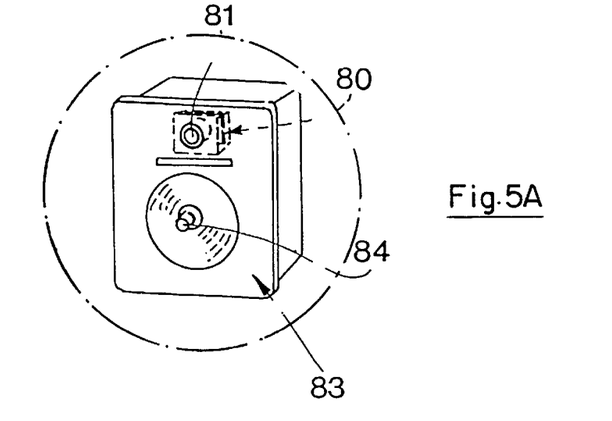
FIG. 5 Office building with a remote unit applied to a bell panel on an outside gate and with a local unit mounted on a computer screen connected by conveyed waves, a partly cut away perspective view.
Figure 5B:
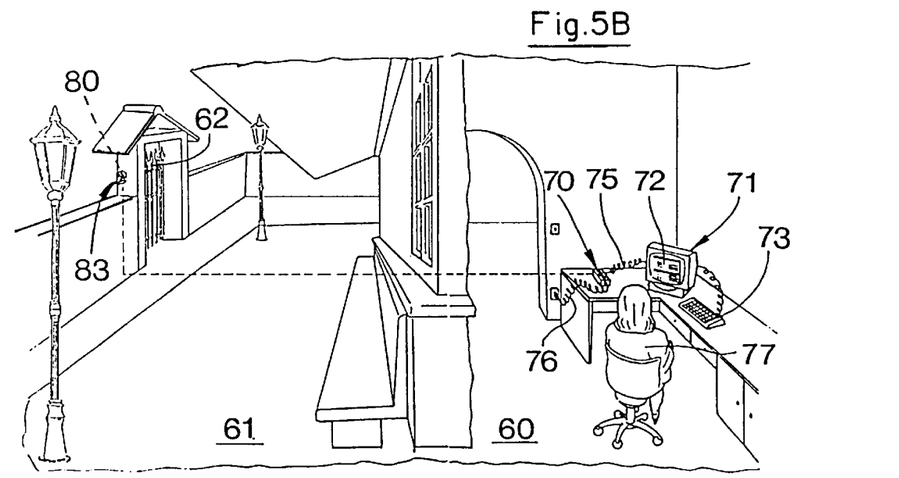
Figure 6:
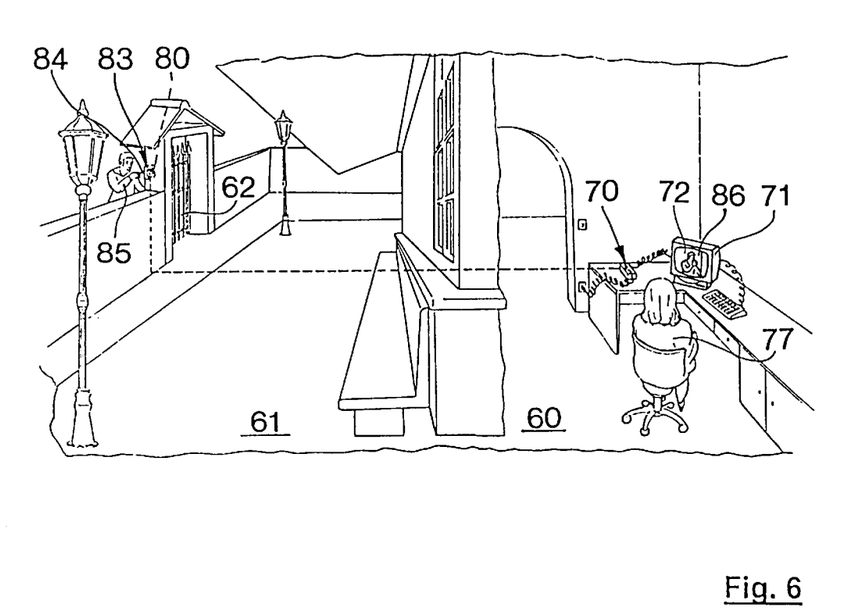
FIG. 6 The office building when the alarm is given.
Figure 7:
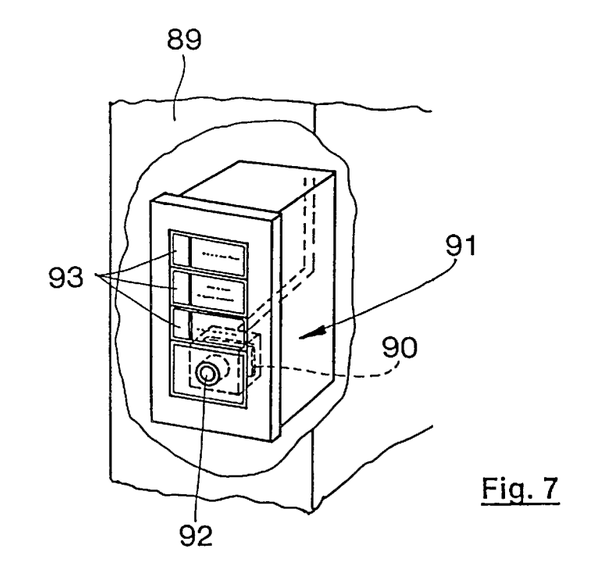
FIG. 7 Detail of a street buzzer panel with a remote unit to connect the porter's lodge with an apartment in the building, perspective.

The electronic local unit can be connected to a computer screen, that of a personal computer for example, while the electronic remote unit can be mounted in the street bell panel at the entrance to a building as seen in FIGS. 5–7.

Said building comprises an office 60 and ground in front 61 with gate 62. In the office there is a computer 71, its screen 72, keyboard 73 and electronic local unit 70 connected by cable 75 to the computer and to main electricity by the cable 76.

The panel 83 installed near the gate 62 comprises a remote unit 80 connected to a microtelecamera 81 and push button 84 (FIG. 5) on the panel 83.

When someone 85 presses the button 84, the image 86 of said person is transferred by the microtelecamera 81 to the screen 72 of the computer 71, automatically replacing the image previously on said screen (FIG. 6). The person 77 using the computer is thereby informed of the presence of a person at the gate and is duly warned.

FIG. 7 shows a street buzzer 91 at the main door 89 of a building with a microtelecamera 92 connected to a remote unit 90.

The figure shows the buttons 93 for the different apartments.

When someone presses a button the remote unit 90 automatically transfers the person's image, through an electronic local unit like that already described, to the screen of a TV set, of a computer or to a video recorder. The street bell panel is therefore transformed into a video bell panel through the screens of equipment in normal use.

In this way not only can the image of a person at the street door by seen, at a great saving compared with cost of a video bell panel, but an effective alarm signal is given similarly to those in the above cases.

The electronic system formed by the local and remote units and by their connections is further illustrated by the block diagrams in FIGS. 8–14. This electronic system is modular and comes in sections so that only the necessary or desired functions can be fitted with remote and local units:

connection of several remote units to one local unit therefore controlling several telecameras, periodically recording and scanning all the images that appear, automatically handling transmission and signal frequencies;

transmission from remote to local units by coaxial cable, radio waves or conveyed waves on the main electricity network.

Transmission of Signals by Coaxial Cable

Figure 8:
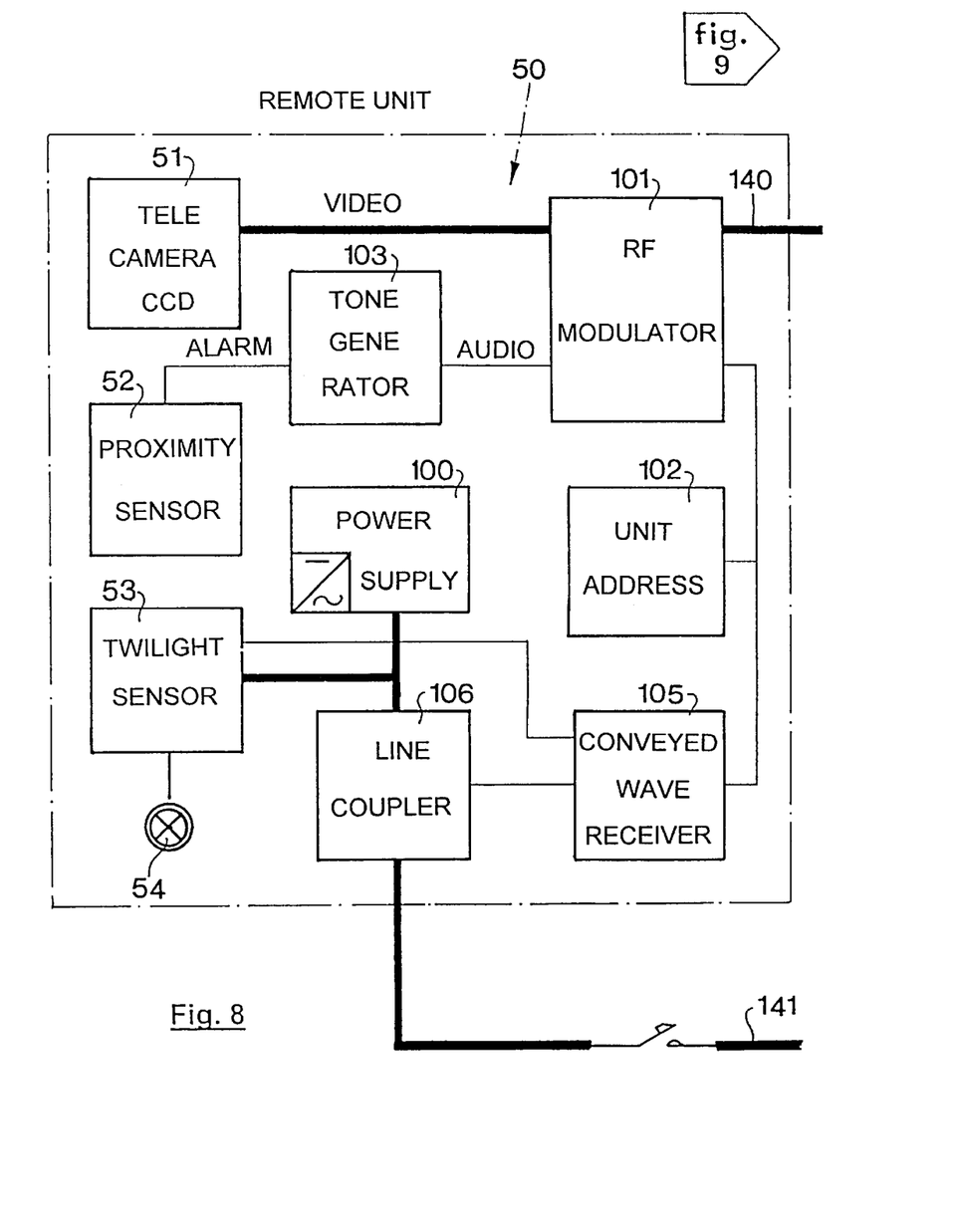
FIG. 8 Block diagram of an electronic remote unit to connect with a local unit by coaxial cable.

Electronic remote unit 50 (FIG. 8).

The feeder 100 feeds all circuits of the remote unit converting primary voltage of 100–110 or 220–240 volts a.c to +12 V d.c. and −12 V d.c.

The telecamera 51 is a miniature type measuring about mm 32×32.

The signal from the telecamera is transmitted to the local unit through the modulator 101 and cable 140.

Each remote unit generates a different frequency linked to the cabled address in the circuits of the unit address 102.

Said circuit comprises a series of microswitches where the address of the unit can be set.

The proximity sensor 52 notes the presence of a person within its own range of action supplying a logic signal that provokes generation of a subaudio tone by a tone generator circuit 103.

Said tone generator is a subaudio oscillator that normally generates a signal which disappears in the presence of a logic order to give the alarm. The audio band of the modulator 101 is used to transmit a subaudio tone that indicates the presence of a person.

The twilight sensor 53 commutes a switch when environmental light falls below a certain level, and lights up the bulb 54 of the street lamp 41. If the logic input of "sensor exclusion" is present, said bulb 54 lights up in any case if there is 100–110 or 220–240 V a.c. current, irrespective of the sensor.

Figure 9:
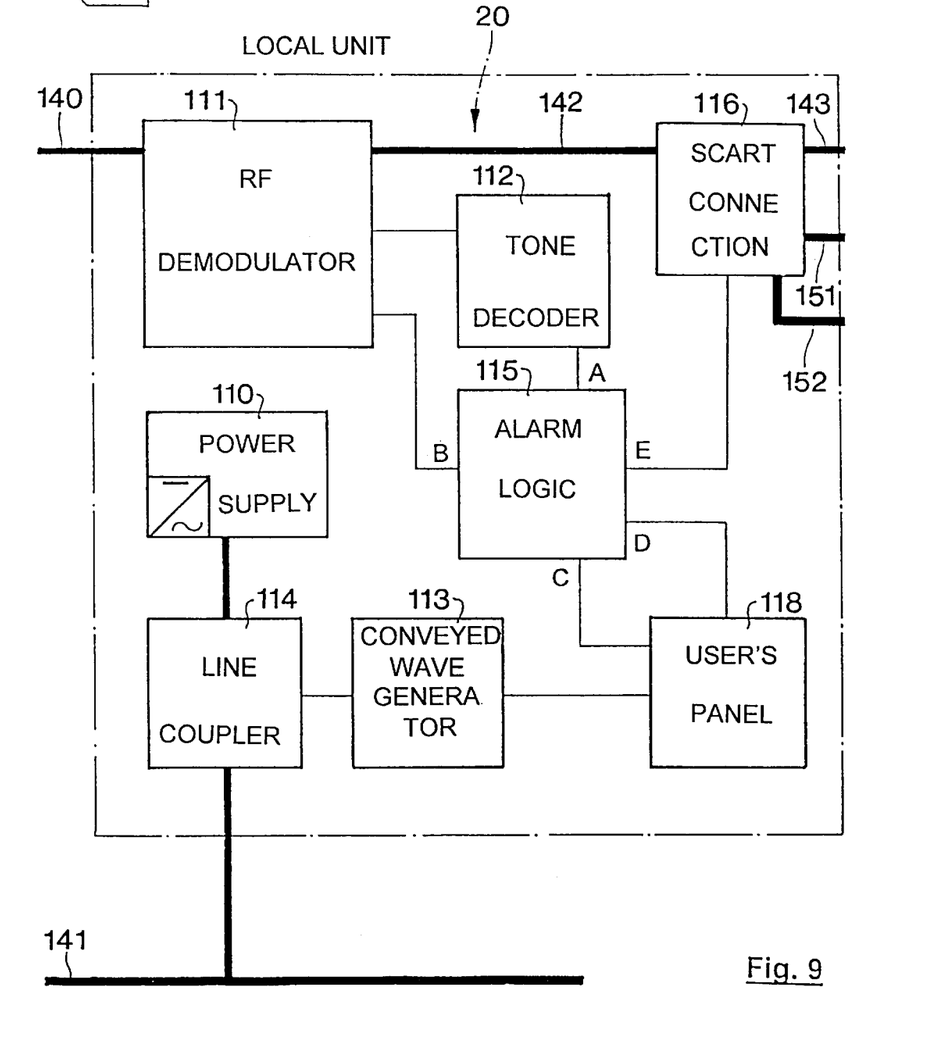
FIG. 9 Block diagram of the above electronic local unit.
Figure 10:
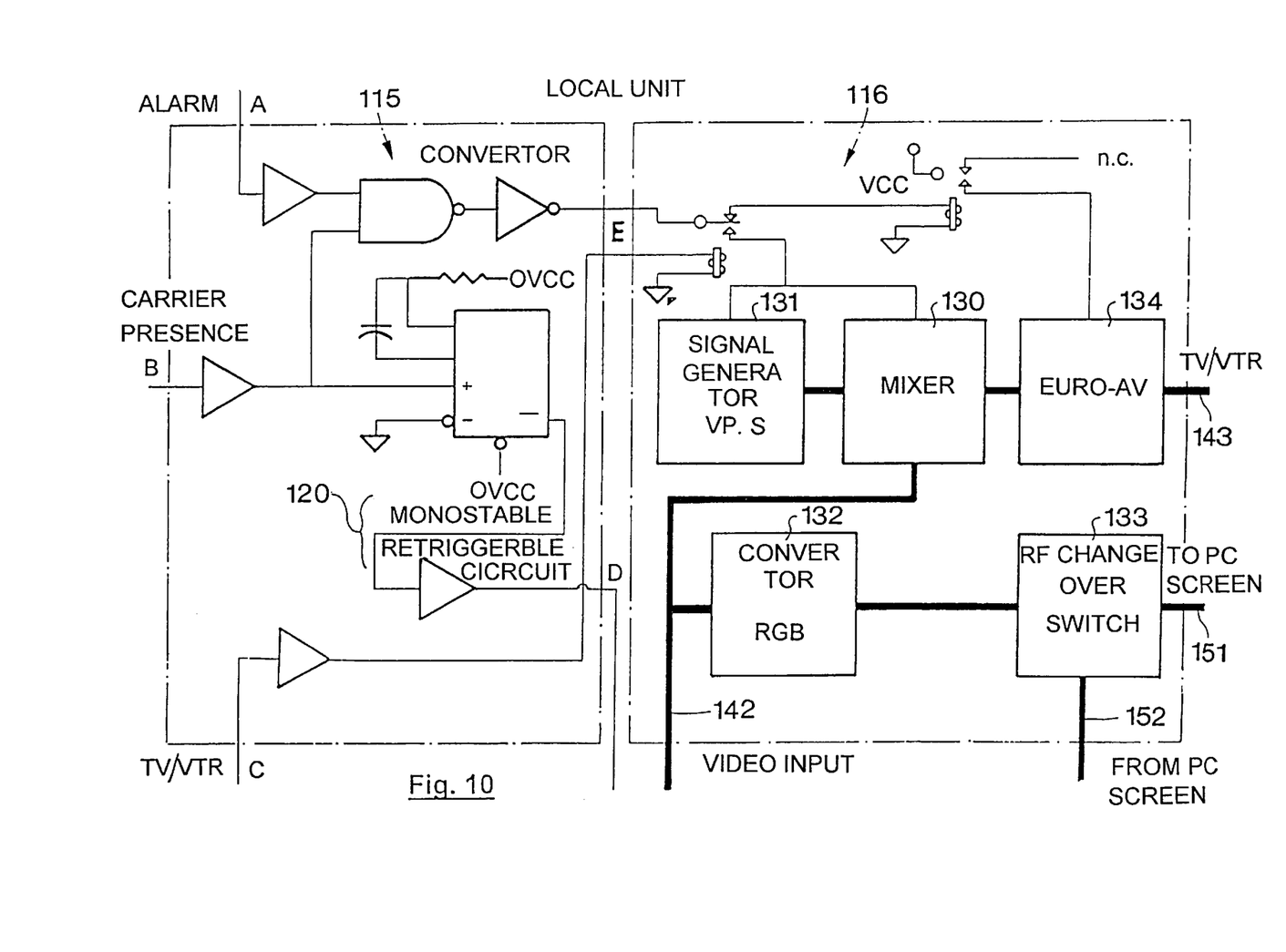
FIG. 10 Detailed diagram of the warning logic and of the logic for Start connection, inserted into the preceding block diagrams.
Figure 11:
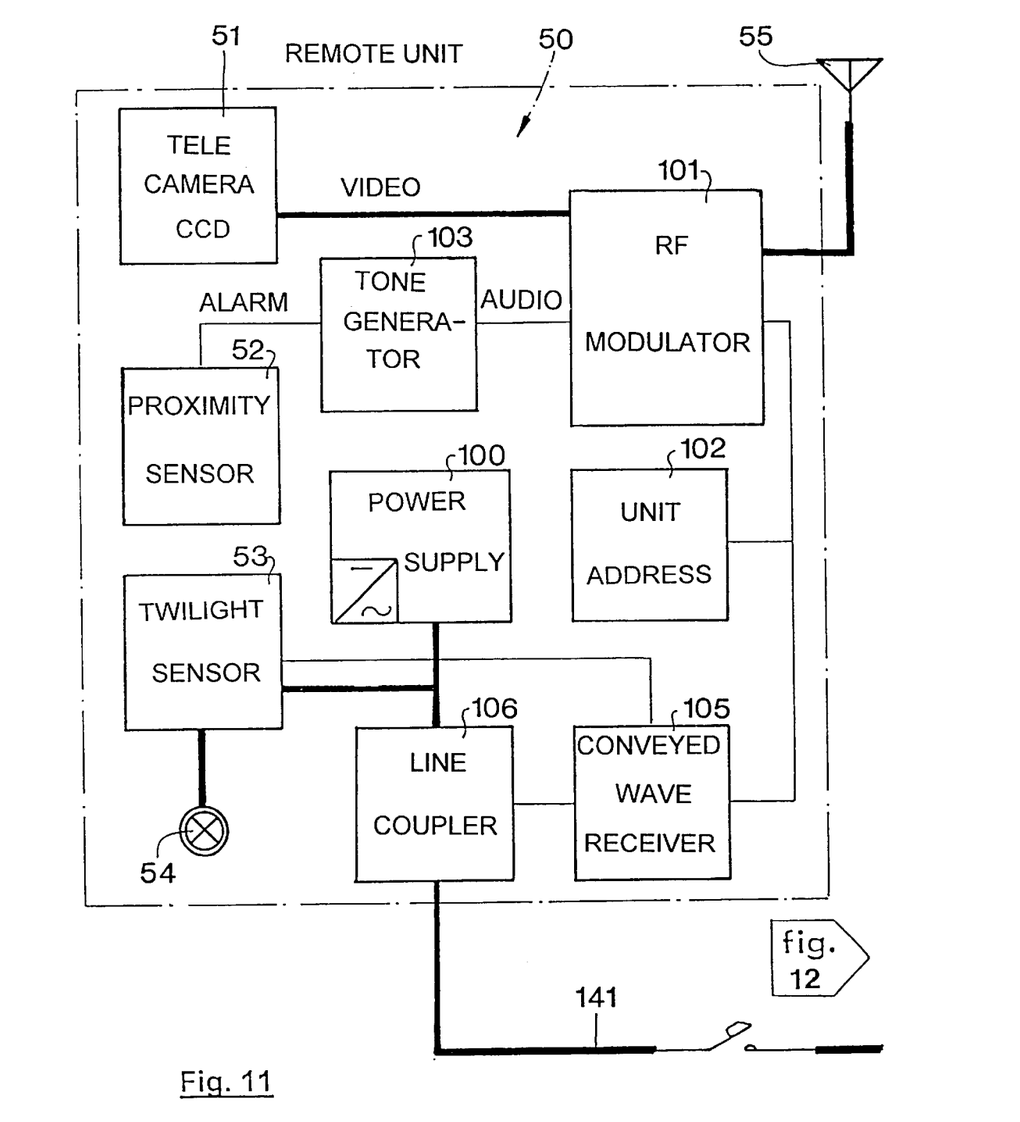
FIG. 11 Block diagram of a remote unit to connect with the local unit by radio frequency.

Electronic local unit (FIGS. 9–11).

This comprises feed 110, the demodulator 111, the tone decoder 112, the alarm logic 115 and the logic 116 of the Scart connector.

The alarm logic generates the warning signal to be presented on the user's panel 118 and the control signal to go to the Scart socket 134. If the signal of "carrier presence" is absent and therefore if there is no active connection, a signal on the panel 116 indicates that the remote unit is out of action.

The "carrier presence" signal at the input is only available periodically as, in the absence of an alarm, the telecamera or telecameras are turned on only for a few seconds at previously established intervals, for example every 30", to reduce circuit consumption.

This "scanning time" interval can be programmed.

A "retriggable" monostable circuit 120 generates the ever-present "active connection" signal if the "carrier" is not missing for longer than the previously set scanning time.

The active connection signal is shown by a LED on the user's panel.

An alarm signal from the tone decoder 112 indicates a presence in front of the telecamera 51.

The simultaneous presence of an alarm signal and of an active connection signal produces the "starting up" signal.

This starting up signal is kept going for a programmable time, 10" for example, even if the starting up conditions disappear.

The user must select on the panel 118 the type of connection for the local apparatus, namely if the Scart socket 134 is to be connected by the cable 143 to a television set or to a video recorder.

If the TV/VTR signal indicates connection to the television set, the starting up signal is converted to a suitable electrical level transmitted to a special pin on the Scart socket.

This signal causes passage of the TV tuner from the current channel to the input video channel 143 on the Scart socket.

If the TV/VTR signal indicates connection to the video recorder, through the VPS signal generator 131 and mixer 130 the starting up signal generates the signal used for video recorders equipped with VPS.

These types of apparatus can be started up or temporarily stopped by a signal sent out from the emitter on the radio channel.

The local unit temporarily stops the video recorder if there is no alarm, adding the necessary VPS action to the radio signal.

For video recorders without VPS, a contact is available between two pins on the Scart socket.

In the event of connection to a PC (FIGS. 5, 6) the block diagram comprises an RGB converter 132 connected to the commuter 133 with PC video input cable 151 and PC video output channel 152.

Figure 12:
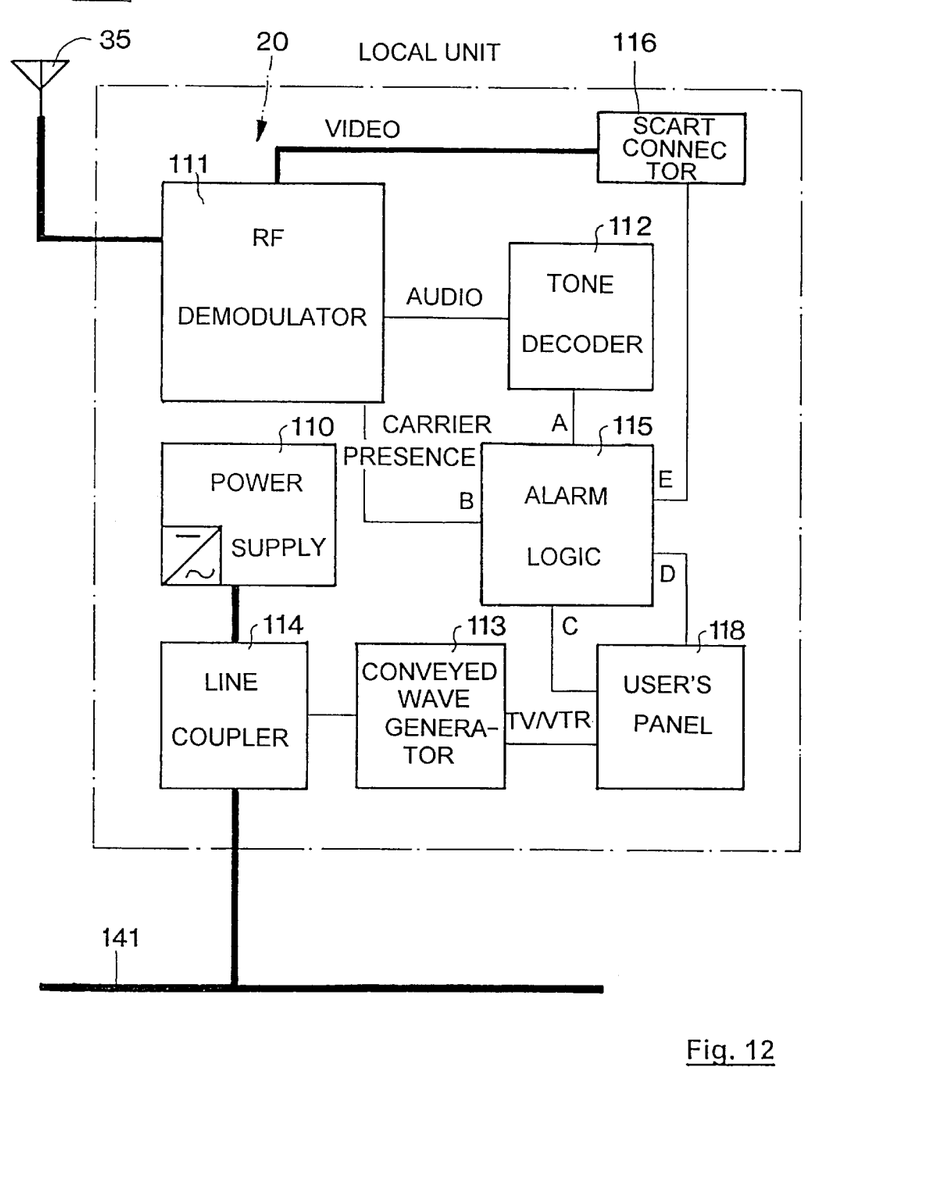
FIG. 12 Block diagram of the above electronic local unit.

The following signals are present on the user's panel:
indication if a remote unit is turned off
indication if there is an alarm from a remote unit
presence of feed to a local unit
light sensor on a remote unit turned off and the following controls:
selection of a remote unit
viewing of an image from a selected unit
exclusion of the light sensor on a selected unit Transmission of Signals by Radio Waves (FIGS. 11, 12)

Signals from the RF modulator 101 are sent from the antenna 55 on the electronic remote unit 50 and are received by the antenna 35 on the electronic local unit and transmitted to the RF demodulator 111.

Figure 13:
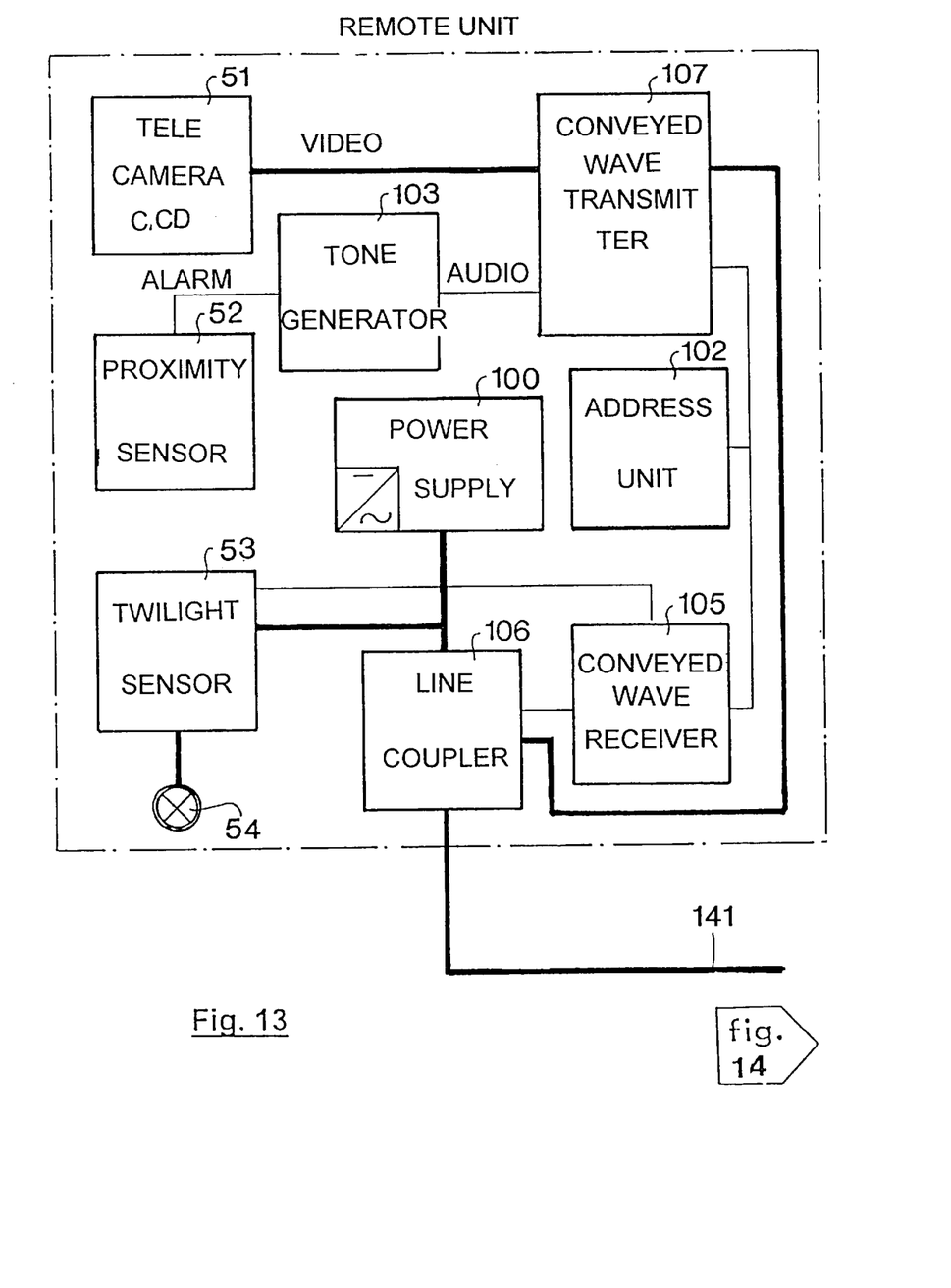
FIG. 13 Block diagram of a remote unit for conveyed-wave connection to the local unit.
Figure 14:
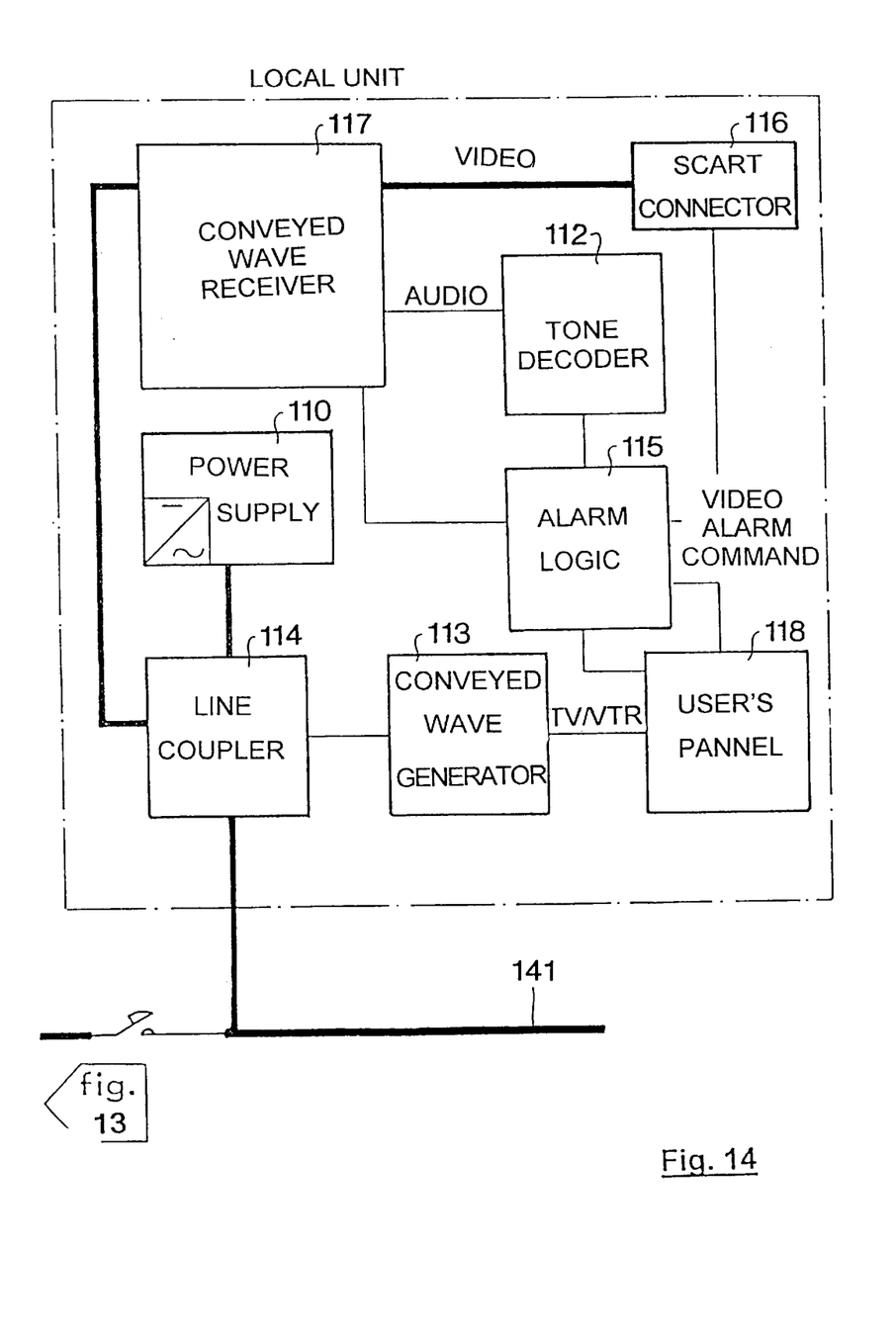
FIG. 14 Overall block diagram of the above electronic local unit.

Transmission of Signals by Conveyed Waves (FIGS. 13, 14)

In place of the RF modulator there is a conveyed wave transmitted 107. This circuit generates the signal to go to a line coupler 106 to be put into the local a.c.feed network.

Coded in the signal is information about the input logic level.

The functions of this circuit are as follows:
prevent network frequency (50 or 60 Hz) from reaching the inputs of receiver 17 or transmitter 107 at levels that can stop their operation
permit reception of a high frequency signal transmitted on the line from an equivalent device placed in any position on the line (locally)
put into the electric line a signal of a sufficiently high level, and of a frequency enabling it to pass along the line.

A short-wave receiver 105 is present that decodes the signal transmitted from another point on the local electricity network by a conveyed-wave generator 113 and relative coupler 114 so that it can be put into the local a.c. network at 50 or 60 Hz.

Information about the input logic level is coded in the signal.

Receptiion frequency depends on the unit address where the receiver is placed.

What is claimed is:

1. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that the remote units (50, 50, 90) show their connection, hereinafter called an "active connection" with the local unit (20, 70) by a signal of "carrier presence" and in that when a proximity sensor (52), associated to the telecameras (51), perceives in its range of action a presence, especially that of a person (57), said sensor transmits to said local unit (20) a warning signal, hereinafter called a "warning signal", and in that when said local unit receives both the signal of "active connection" and the "warning signal" it produces a signal, hereinafter called a "starting up signal", that determines transmission of the image (58) to the screen of the television set (11) or of the computer, or to the video recorder.

2. Electronic system as in claim 1, characterized in that, as soon as a presence (57, 85) enters the range of action of the telecameras (51, 81, 92), the remote units (50, 80, 90) automatically transmit the image (58, 86) of said presence to the local unit (20, 70).

3. Electronic system as in claim 1, characterized in that, when a person (85) presses a button (84) on a bell panel (83) placed at the entrance to a building, or on the panel (93) of a street buzzer (94) and the like, so entering the range of action of the tele-cameras (92), the remote units (50, 80, 90) transmit the image of said person to the local unit (70).

4. Electronic system as in claim 2, characterized in that, on receiving the image transmitted by the remote units (50, 80, 90), the local unit (20, 70) automatically turns on the screen of a television set (11) or computer (71), or turns on a video recorder (12).

5. Electronic system as in claim 2, characterized in that, on receiving the image from the remote units (50, 80, 90), the local unit (20, 70) automatically replaces those that may be present on the screen (72) of a television set (111) or of a computer (71, or that may in process of recording, with the image (17, 58, 86) received.

6. Electronic system as in claim 1, characterized in that the choice of the user is transformed into a TV/VTR signal that indicates connection to the screen (72) or to the video recorder (12), the "warning signal" being converted, if the screen is connected, into a suitable electric level transmitted to a pin on the Scart socket (116), if a VPS-equipped video recorder is connected, into an electric signal specific for that apparatus and, if a video recorder (12) not equipped with VPS is connected, into a signal made to reach a contact placed between two pins on the Scart socket (116).

7. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that the remote units are fitted with a twilight sensor (53) which, when environmental light falls below a certain level, operates a switch that turns on a bulb (54) that lights up the field of action of the telecameras (51).

8. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or that are being recorded, R being thus possible to see in good time and to record in real time images (58, 86) of a possible ill-intentioned person (57, 85) or intruder generally, that in its modular and built in sections enabling remote units (50, 80, 90) and local units (20, 70) to be equipped only for the desired functions, according to needs and preferences, to connect one or more and one or another of the remote units with the local unit, to have a single local unit (20, 70) deal automatically with the transmission frequencies from the remote units (50, 80, 90), to decide connections between remote units and electronic local units by coaxial cable, radio frequency, conveyed waves on the local electricity network or on other known means.

9. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video reorder (12) and the like, each remote unit automatically transmitting, when a presence especially a person (57, 85) enters the telecamera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that the "active connection" between one or more remote units (50, 80, 90) and the local unit (20, 70) by means of an input signal of "carrier presence", is available only periodically because in the absence of the warning signal, the telecameras (51, 81, 92) are turned on only for a few seconds with previously set and programmable times of expiry and scanning, a retriggerable monostable circuit (120) generating an ever-present signal of "active connection" if the signal of "carrier presence" is not lacking for longer than the previously-set scanning time.

10. Electronio warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that the local unit (20, 70) comprises a control panel on which the user (18, 77) can choose, by means of a Scart socket (22), to have connection made to the screen of a television set (11) or of a computer (7) or to a video recorder (12) and the like, and can operate the following functions:

selection of the remote unit (50, 80, 90)

exclusion of the twilight sensor (53) on a selected unit     transmission of the image (58) from the remote unit (50) to a TV screen (11)

transmission of the image (86) from the remote unit (50) to a video recorder (12)

and can detect by means of visual (23) and acoustic (34) devices the following signals:

remote unit (50, 80, 90) turned off

"warning signal" from a remote unit (50, 80, 90)

twilight sensor (53) turned off on a remote unit (50, 80, 90).

11. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that if transmission is made by radio waves (66, 36), the signal from a telecamera (51) modulates, by means of an RF modulator (101), a radio-frequency carrier, radiated by means of a small antenna (55), that comes from a tone-generator circuit (103), there being a different one for each remote unit (50) it being linked to the cabled address in "unit addresses" circuits (102), the audio band of the modulator (101) being used for transmission in a subaudio tone for signalling a presence, especially that of a person (57, 85) within the field of action of the proximity sensor (52).

12. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that if transmission is made by conveyed waves, the signal from the telecameras (51, 81, 92) is coded and sent to a line coupler (106) that carries it along the electricity network, prevents network frequency, 50 or 60 Hz for example, from reaching the input of the receiver (117) or of the transmitter (107) at levels that can prevent them from operating, puts into the electricity network a signal of a sufficiently high level and of a frequency such that allows it to pass along the line, a conveyed-wave receiver (117) then decoding the signal so transmitted.

13. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that in the local unit (20, 70) there is a conveyed-wave generator (113) that generates the signal, in which information inherent to the input logic level is coded, to be passed on to the line coupler (114) for insertion into the local a.c. feed network while, in the remote units (50, 80, 90), there is a conveyed wave receiver (105) that decodes the transmitted signal at a frequency corresponding to the address of the unit where the receiver is placed.

14. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that the local unit (20, 70) comprises acoustic (34) and visual (32) warning devices, preferably placed on the panel, that signal a presence within the range of action of the telecameras (51, 81 92) so as to warn the user (18, 77) of said presence unless it is in the neighbourhood of the screen (72) or unless it is of no interest to said screen.

15. Electronic warning and protection system against intruders for isolated house, apartment and office buildings generally, characterized in that it comprises one or more transmitting electronic units, here called remote units (50, 80, 90), equipped with microtelecameras (51, 81, 92), placed at the entrances, in the internal and external areas (40, 61) of the buildings (10, 60) to be guarded and comprises a receiving electronic unit, hereinafter called a local unit (20, 70) connected to the screen (72) of a television set (11) or of a computer (71) or to a video recorder (12) and the like, each remote unit automatically transmitting, when a presence especially a person (57, 85) enters the tele-camera's range of action, the image of said presence (58, 86) to the local unit (20, 70) that transfers it to the screen (72) or to the videocassette of the video recorder (12), said image replacing any that may be already present on the screen or that are being recorded, it being thus possible to see in good time and to record in real time images (58, 86) of a possible ill-intentioned person (57, 85) or intruder generally, that the remote units (50, 80, 90) are associated with, the addition of other material, to ordinary street lighting (41), light bulbs, lighting equipment, push-button panels (83) for bells, street buzzers (91) and other forms of use.

\* \* \* \* \*